July 26, 1966

C. S. TALLMAN 3,263,056

ARC WELDING APPARATUS

Filed March 19, 1965

INVENTOR
Clifford S. Tallman

BY Connolly and Hutz
ATTORNEYS

July 26, 1966  C. S. TALLMAN  3,263,056
ARC WELDING APPARATUS
Filed March 19, 1965  2 Sheets-Sheet 2
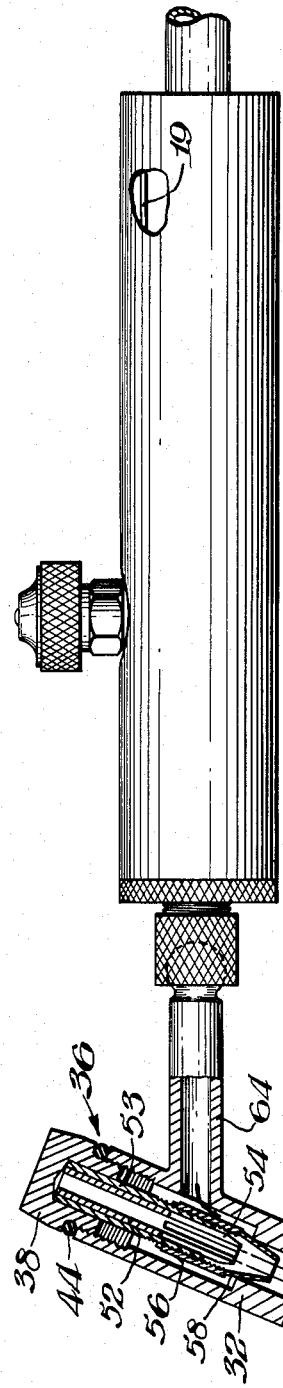
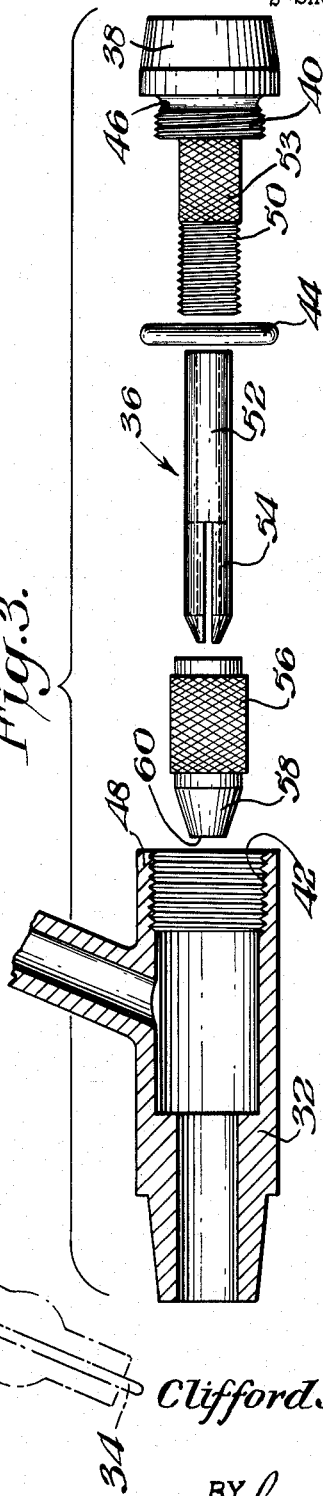
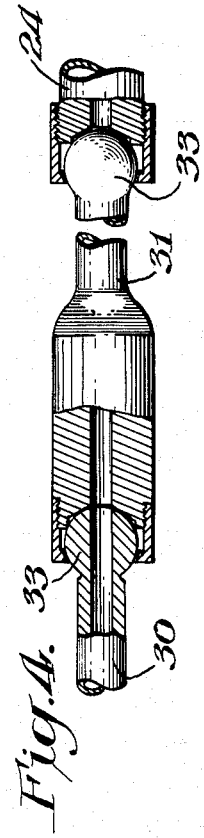
INVENTOR
Clifford S. Tallman
BY Connolly and Hutz
ATTORNEYS – # United States Patent Office 3,263,056
Patented July 26, 1966

3,263,056
ARC WELDING APPARATUS
Clifford S. Tallman, New City, N.Y., assignor to Eutectic Welding Alloys Corporation
Filed Mar. 19, 1965, Ser. No. 441,185
6 Claims. (Cl. 219—75)

This invention relates to a gas-shielded arc welding apparatus, and more particularly to such an apparatus which incorporates an electrode at its tip portion.

In such arc welding apparatuses or torches, different size electrodes are used in different welding operations. The electrode size ranges, for example, from 0.010 to 0.125 inch in diameter. The collets for holding the electrode in present devices lack the versatility for effectively holding such widely divergent size electrodes. Accordingly, when a different size electrode is to be inserted in the torch, the collet must also be replaced.

With such torches the electrodes are positioned in the flow of an inert gas stream which shields the electrode, and aids in obtaining proper weld deposits. In the aforedescribed present torches, however, the gas flows directly through the collets which necessitates a more complicated structure.

An object of this invention is to provide a collet arrangement which can effectively hold a wide variety of different diameter electrodes.

A further object is to provide such a collet arrangement which is simple in operation without hampering its versatility.

In accordance with this invention, the collet is positioned in the tip portion of the torch above the inert gas conduit which communicates with the hollow tip with its front portion extending only partially in the gas flow. The collet includes a tubular gripping member which has a plurality of fingers for holding the electrode. The gripping member is secured in a tubular retainer at one end of the torch tip, and a tapered adjustable sleeve engaged with the retainer contacts the fingers for selectively moving the fingers closer together or permitting them to spread further apart in accordance with the particular electrode. In the beginning of a welding operation, the entire collet assembly is removed from the torch tip. The electrode is inserted between the fingers, and the adjustable sleeve is manipulated to securely clamp the fingers around the electrode. The entire assembly, including the clamped electrode, is then replaced in the torch tip and the torch is ready for operation.

In an advantageous form of this invention, the torch tip is opened at both ends with the electrode projecting through one end. The collet assembly includes a cap which fits into the other end of the torch tip and carries the retainer. The electrode gripping member is secured to this extension and its fingered end is tapered to correspond to the taper of the adjustable sleeve. The retainer also has external threads engaging the internal threads of the sleeve. Accordingly, when the sleeve is moved up the retainer, the fingers are squeezed together to hold smaller diameter electrodes. Correspondingly, when the sleeve is moved down the retainer, the spring fingers are permitted to spread further apart for holding larger diameter electrodes.

Novel features and advantages of the present invention will become apparent to one skilled in the art from a reading of the following description in conjunction with the accompanying drawings in which:

FIG. 2 is a side view, partially broken away and in section of the torch shown in FIG. 1;

FIG. 3 is an enlarged assembly view of the tip portion of the torch shown in FIGS. 1-2; and FIG. 4 is a side view in elevation partially in section of a modified portion of the torch shown in FIGS. 1-2.

Figure 1:
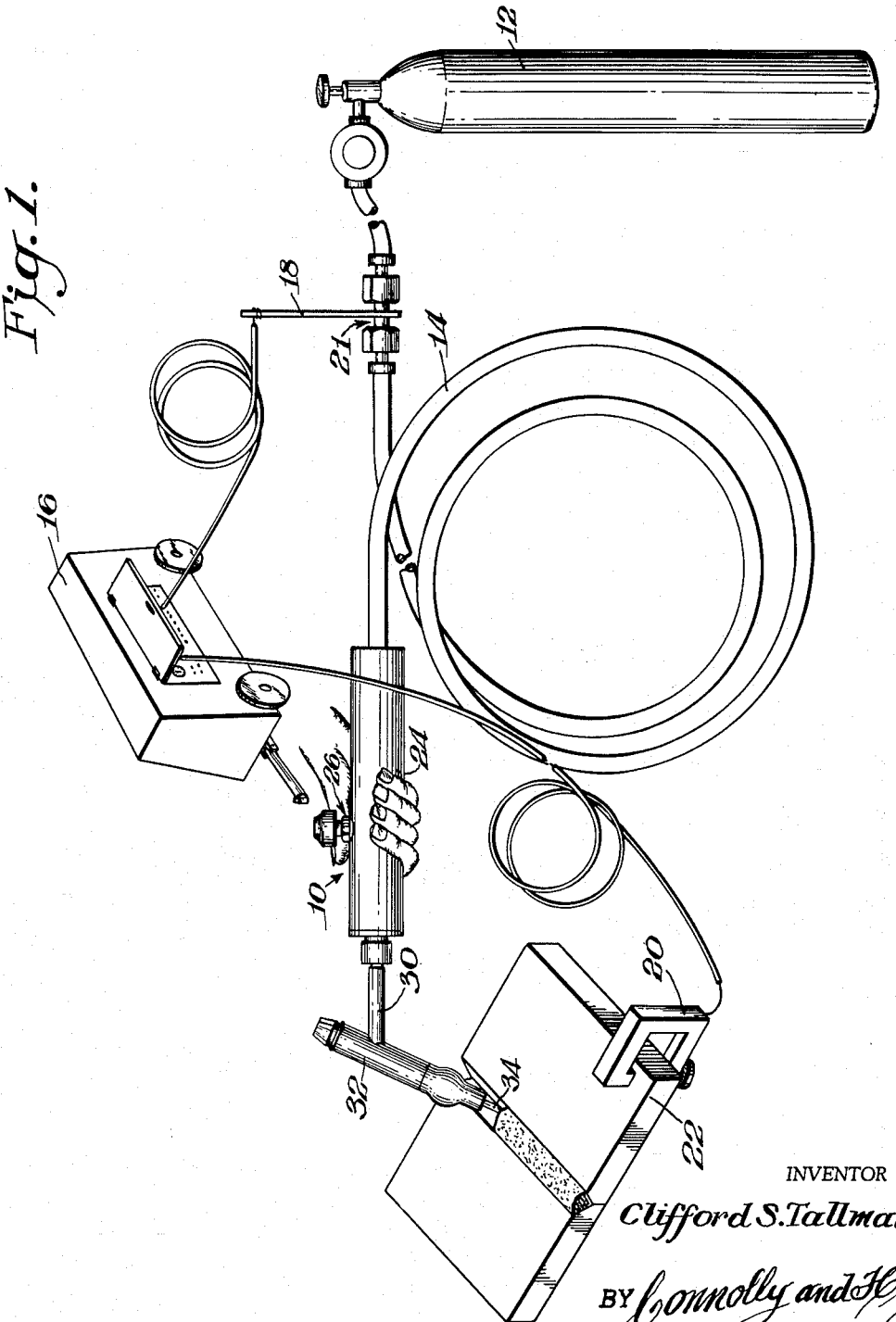
FIG. 1 is a perspective view of one embodiment of this invention.

As shown in FIGURE 1, the arc welding apparatus 10 is supplied with inert gas from cylinder 12 through tube or conduit 14. The power for the welding operation is provided by generator 16. Contact rod 18 is connected to generator 16 and contacts a conductive portion of torch 10, while the electrical circuit is completed by conductor 20 secured to the article 22 to be welded. The power is transmitted through apparatus 10 by a loose wire 19 (FIG. 2) connected to contact 21 (FIG. 1) and extending into torch handle 24. As also shown in FIGURE 1, welding torch 10 includes a handle section 24 having a throttling valve 26 which is described in detail in co-pending application S.N. 424,934, filed January 12, 1965. Universally connected neck or extension 30 is secured to handle 24 and to tip 32, while electrode 34 is secured in tip section 32.

As shown in FIGURE 2, electrode 34 is secured in tip section 32 by a collet assembly 36. FIGURE 3 shows the details of the various elements of collet assembly 36. As indicated in FIGURES 2-3, collet assembly 36 includes a cap 38 having a threaded portion 40 for engagement with the internal threads 42 of the hollow tip 32. A sealing ring, such as O-ring 44, is secured in the groove 46 against the top edge 48 of tip section 32 when the collet assembly 36 is in place to assure the top portion of tip 32 being effectively leak-proof.

Collet cap 38 is mounted around an externally threaded retainer 50 which is hollow for receiving expandable split sleeve or cylindrical gripping member 52. A portion 53 of retainer 50 has, for example, a diamond knurled surface for facilitating the manipulation or gripping of collet assembly 36 as later described. One end of collet gripping member 52 is partially slotted to provide a plurality of spring fingers 54. The edge of fingers 54 is bevelled so that the spring fingers are tapered. An adjustable sleeve 56 is internally threaded to engage retainer 50 in cap 38. The tip 58 of sleeve 56 is tapered to provide a contact edge 60 which is engaged over the tapered fingers 54 as shown in FIGURE 2. The upper exposed portion of sleeve 56 also has a diamond knurled surface to facilitate its manual manipulation.

When electrode 34 is to be inserted in tip portion 32 of torch 10, cap 38 is first rotated to disengage its threaded portion 40 from threads 42 of the top portion of section 32. The entire collet assembly 36 is then removed from tip 32. Knurled portions 53 and 56 of the retainer and sleeve respectively are held and rotated with respect to each other so that sleeve 56 is moved down retainer 50 to permit spring fingers 54 to spread apart. If an electrode was still in the collet from a prior operation, it is then withdrawn from the fingers. Electrode 34 is inserted between fingers 54, and adjustable sleeve 56 is moved up or tightened onto retainer 50. As sleeve 56 is moved up retainer 50, its contact edge 60 squeezes fingers 54 against electrode 34 to clamp the electrode in place.

The fingers are so flexible that they flatten out and, accordingly, have a substantial area of contact with electrode 34 to securely maintain it in the collet assembly 36. Collet assembly 36 can effectively hold electrodes ranging in diameter from, for example, 0.010 inch to 0.125 inch. The entire collet assembly 36, including the clamped electrode 34, is then replaced in tip 32 as shown in FIGURE 2.

FIGURE 4 shows a modification in which an extension rod 31 is secured between neck 30 and handle 24 so that the length of torch 10 can be increased for special operations. Additionally, the ball and socket joints 33 permits the angle of torch tip 32 to be substantially varied with respect to handle section 24 for reaching otherwise inaccessible locations.

What is claimed is:

1. An arc welding apparatus comprising a torch having a handle section, a tip section secured to said handle section, an inert gas conduit in said torch extending through said handle section and said tip section, means at one end of said conduit for connection to a supply of inert gas, a collet assembly in said tip section for holding an electrode, said collet assembly including a tubular retainer, a gripping member in said retainer, said gripping member having adjustable gripping fingers projecting from said retainer for clamping around the electrode, an adjustable sleeve on said retainer contacting said gripping member for selectively moving said fingers closer together and permitting said fingers to spread further apart whereby said gripping member may hold different diameter electrodes, and said collet assembly being disposed substantially out of the stream of inert gas flowing through said conduit.

2. An apparatus as set forth in claim 1 wherein said gripping member is a partially slotted cylinder of resilient material whereby its slotted end constitutes a plurality of spring fingers, the ends of said fingers being tapered, and said sleeve having a tapered end fitting over said tapered fingers.

3. An apparatus as set forth in claim 2 wherein said tip section is hollow and open at both ends, a collet cap engaging one end of said tip section, said retainer being externally threaded and being mounted in said cap, and said sleeve being internally threaded and engaged with said retainer.

4. An apparatus as set forth in claim 3 wherein sealing means are between said cap and said one open end of said tip section to prevent leakage of inert gas through said one open end of said tip section.

5. An apparatus as set forth in claim 1 wherein said tip section is connected to said handle section by an elongated neck, said neck being at an angle with respect to said tip section, ball and socket joint means connecting said neck to said handle section, said neck including a pair of hollow rods, and ball and socket joint means connecting said rods to each other.

6. An arc welding apparatus comprising a torch having a handle section, a hollow tip section connected to one end of said handle section, an inert gas conduit in said torch extending through said handle section and said tip section, means at one end of said conduit for connection of a supply of inert gas, said tip section being open at both ends and disposed at an angle to said handle section, a collet assembly closing one open end of said tip section, said collet assembly including a collet cap engaged with said one open end of said tip section, a tubular retainer in said collet cap projecting into said tip section, a partially slotted resilient gripping member in said retainer, the slotted end of said gripping member comprising a plurality of spring fingers for holding an electrode, the end of said spring fingers being tapered, an adjustable sleeve engaged with said cap retainer, and said sleeve having a tapered end contacting said tapered spring fingers whereby longitudinal movement of said sleeve with respect to said retainer causes said spring fingers to selectively move closer together and permits them to spread further apart for holding different diameter electrodes.

References Cited by the Examiner
UNITED STATES PATENTS

| | | | |
|---|---|---|---|
| 2,514,060 | 8/1950 | Himmelman | 219—75 |
| 2,922,868 | 1/1960 | Hackman et al. | 219—75 |
| 3,003,050 | 10/1961 | Correy | 219—75 |

RICHARD M. WOOD, *Primary Examiner.*